United States Patent
Ogasawara et al.

(10) Patent No.: US 10,994,637 B2
(45) Date of Patent: May 4, 2021

(54) SEAT SLIDER DEVICE

(71) Applicant: TOYOTA BODY SEIKO CO., LTD., Takahama (JP)

(72) Inventors: Takayuki Ogasawara, Takahama (JP); Shin Shiraki, Takahama (JP); Hiroki Okamoto, Takahama (JP); Yoichi Fujii, Takahama (JP)

(73) Assignee: TOYOTA BODY SEIKO CO., LTD., Takahama (JP)

( * ) Notice: Subject to any disclaimer, the term of this patent is extended or adjusted under 35 U.S.C. 154(b) by 9 days.

(21) Appl. No.: 16/560,397

(22) Filed: Sep. 4, 2019

(65) Prior Publication Data

US 2020/0086767 A1 Mar. 19, 2020

(30) Foreign Application Priority Data

Sep. 14, 2018 (JP) .............................. JP2018-172147

(51) Int. Cl.
*B60N 2/00* (2006.01)
*B60N 2/07* (2006.01)

(52) U.S. Cl.
CPC ............ *B60N 2/0725* (2013.01); *B60N 2/072* (2013.01)

(58) Field of Classification Search
CPC ........ B60N 2/0715; B60N 2/06; B60N 2/067; B60N 2/07; B60N 2/0702
USPC ........................................ 248/424, 429, 430
See application file for complete search history.

(56) References Cited

U.S. PATENT DOCUMENTS

| | | | | |
|---|---|---|---|---|
| 4,805,866 A | * | 2/1989 | Aihara ................. | B60N 2/0232 248/429 |
| 5,507,552 A | * | 4/1996 | Ineich .................. | B60N 2/0232 248/430 |
| 10,583,752 B2 | * | 3/2020 | Higuchi ............... | B60N 2/0727 |
| 2004/0155168 A1 | | 8/2004 | Matsushiro | |
| 2009/0020331 A1 | * | 1/2009 | Tsubaki ................ | H02G 11/00 174/72 A |
| 2016/0114703 A1 | * | 4/2016 | Fujita ................... | B60N 2/0825 297/344.1 |
| 2018/0334054 A1 | * | 11/2018 | Higuchi ................ | B60N 2/067 |
| 2020/0055425 A1 | * | 2/2020 | Akutsu ................. | B60N 2/0284 |
| 2020/0345139 A1 | * | 11/2020 | Kim ....................... | F16H 19/06 |

FOREIGN PATENT DOCUMENTS

| CN | 111867881 A | 10/2020 |
|---|---|---|
| DE | 102011011505 A1 | 8/2012 |
| JP | H06-092169 A | 4/1994 |
| JP | 2001-001800 A | 1/2001 |
| JP | 2004-210113 A | 7/2004 |
| JP | 2012-201268 A | 10/2012 |

(Continued)

OTHER PUBLICATIONS

U.S. Appl. No. 17/041,793 in the name of Akihiko Motozaki, filed Sep. 25, 2020.

*Primary Examiner* — Steven M Marsh
(74) *Attorney, Agent, or Firm* — Oliff PLC (57) ABSTRACT

A seat slider device may include a lower rail attachable to a body of a vehicle; a belt arranged along a longitudinal direction of the lower rail and having both ends thereof fixed; and an upper rail attachable to a seat, slidably engaging with the lower rail, and including an actuator configured to feed the belt. The actuator may be configured to apply a drive force on a lower surface of the belt.

9 Claims, 7 Drawing Sheets

(56) References Cited

FOREIGN PATENT DOCUMENTS

| | | | |
|---|---|---|---|
| JP | 2016-215931 | A | 12/2016 |
| JP | 2017-114291 | A | 6/2017 |
| JP | 2019-194072 | A | 11/2019 |
| WO | 2015/011795 | A1 | 1/2015 |
| WO | 2019/208667 | A1 | 10/2019 |

* cited by examiner

SEAT SLIDER DEVICE

CROSS-REFERENCE TO RELATED APPLICATION

This application claims priority to Japanese Patent Application No. 2018-172147 filed on Sep. 14, 2018, the contents of which are hereby incorporated by reference into the present application.

TECHNICAL FIELD

The teaching disclosed herein relates to a seat slider device which slides a seat of a vehicle by an actuator.

BACKGROUND

A seat slider device that moves (slides) a seat by an actuator is known. A seat slider device described in Japanese Patent Application Publication No. 2004-210113 arranges a lead screw inside its lower rail. On the other hand, an upper rail thereof is provided with a screw nut that engages with the lead screw, and a motor and a worm gear that rotate the screw nut. When the screw nut is rotated by the motor and the worm gear, the upper rail (that is, a seat) moves along with the screw nut.

The seat slider device described in Japanese Patent Application Publication No. 2004-210113 is provided with a shutter that covers an opening of the lower rail so as to prevent dust from adhering to the lead screw. The shutter has a shape of an endless belt and is hung between rollers arranged at respective ends of the lower rail. The opening is closed by an upper portion of the shutter extending between the pair of rollers. A hole is provided in the shutter, and the upper rail protrudes upward from inside of the lower rail through the hole. As such, the shutter moves following the upper rail when the upper rail moves.

SUMMARY

The seat slider device described in Japanese Patent Application Publication No. 2004-210113 requires a complicated mechanism to prevent dust adhesion to the lead screw. The disclosure herein provides art that prevents adhesion of dust, which could be a problem to a mechanism configured to move an upper rail, by using a simple structure.

A seat slider device disclosed herein may comprise a lower rail attachable to a body of a vehicle; a belt arranged along a longitudinal direction of the lower rail and having both ends thereof fixed; and an upper rail attachable to a seat, slidably engaging with the lower rail, and comprising an actuator configured to feed the belt. The actuator may be configured to apply a drive force on a lower surface (a downward-facing surface) of the belt. Since this seat slider device moves the upper rail (the seat) by applying the drive force onto the lower surface of the belt to which dust is less likely to adhere, problems resulting from dust adhesion are less likely to occur.

The actuator may comprise a drive roller or a drive gear that is in contact with the lower surface of the belt. In case of the former, the belt may be a friction belt that is configured to apply the drive force by friction between the lower surface and the drive roller. In case of the latter, the belt may be provided with teeth that are located on the lower surface so as to engage with the drive gear. This toothed belt is also called as a cogged belt.

The belt may be placed within the lower rail. This configuration makes dust adhesion more difficult than a configuration where the belt is exposed on a floor of the vehicle. Further, the belt cannot be seen from a passenger, which provides a good appearance.

Alternatively, the lower rail may be provided with an opening elongated along the longitudinal direction, and the belt may cover the opening. The belt, which is configured to move the upper rail (the seat), also serves as a cover that prevents dust from entering inside of the lower rail. Further, in case of the toothed belt, the teeth of the belt may engage with the opening of the lower rail. Due to this, the toothed belt is less likely to be detached from the opening.

As an example, the actuator of the upper rail may comprise a pair of guides and a drive roller or a drive gear. Each of the pair of guides is arranged respectively at each end of the upper rail in the longitudinal direction. The pair of the guides is in contact with an upper surface (an upward-facing surface) of the belt which covers the opening. The drive roller is arranged between the pair of guides and is in contact with a part of the lower surface of the belt that is pulled away from the opening. The drive gear is arranged between the pair of guides and is in contact with a part of the lower surface of the belt that is pulled away from the opening. The drive gear is configured to engage with the teeth on the lower surface. The upper rail can be moved by a simple mechanism.

Details and further improvements of the art disclosed herein will be described in the following DETAILED DESCRIPTION.

DETAILED DESCRIPTION

First Embodiment

Figure 1:
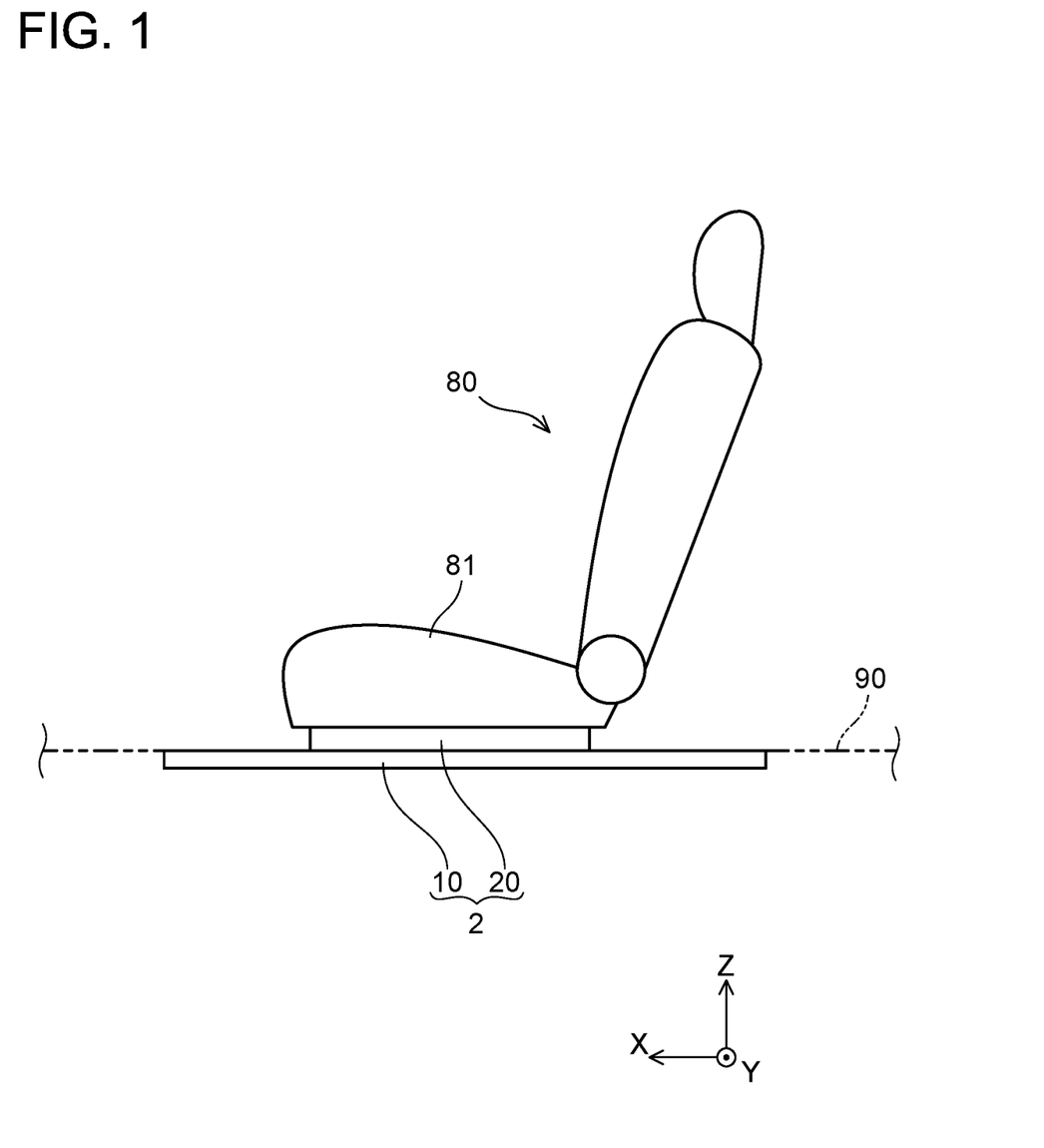
FIG. 1 is a side view of a seat slider device of a first embodiment.

A seat slider device 2 of a first embodiment will be described with reference to the drawings. FIG. 1 shows a side view of the seat slider device 2 mounted on an automobile. The seat slider device 2 is constituted of a lower rail 10 and an upper rail 20. The upper rail 20 is movably (slidably) attached relative to the lower rail 10. The lower rail 10 is fixed to a floor panel 90 of the vehicle. The upper rail 20 is attached to a lower portion of a seat cushion 81 of a seat 80. The seat slider device 2 is attached to each of right and left sides of the lower portion of the seat cushion 81. An X direction in a coordinate system in the drawing corresponds to a rail longitudinal direction of the lower rail 10 and the upper rail 20. A Y direction corresponds to a rail short direction. A +Z direction in the coordinate system of the drawing corresponds to an upward direction. For the sake of convenience of the explanation, a +X direction is termed "front" and −X direction is termed "rear". The meanings of the respective axes of the coordinate system apply similarly in the other drawings as well. Although a detailed description will be given later, the upper rail 20 is provided with an actuator. Depiction of the actuator is omitted in FIG. 1. The upper rail 20 is movable relative to the lower rail 10 by the actuator. That is, the seat slider device 2 can move (slide) the seat with electric power.

Figure 2:
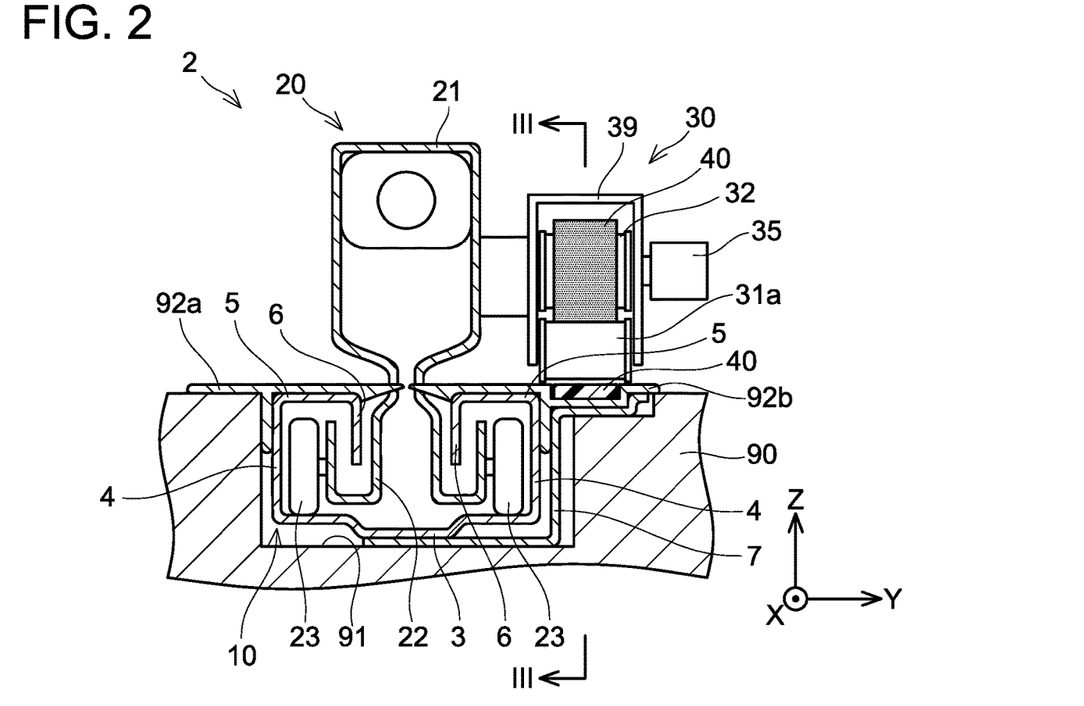
FIG. 2 is a cross-sectional view of the seat slider device sectioned along a plane that intersects perpendicularly to a rail longitudinal direction.
Figure 3:
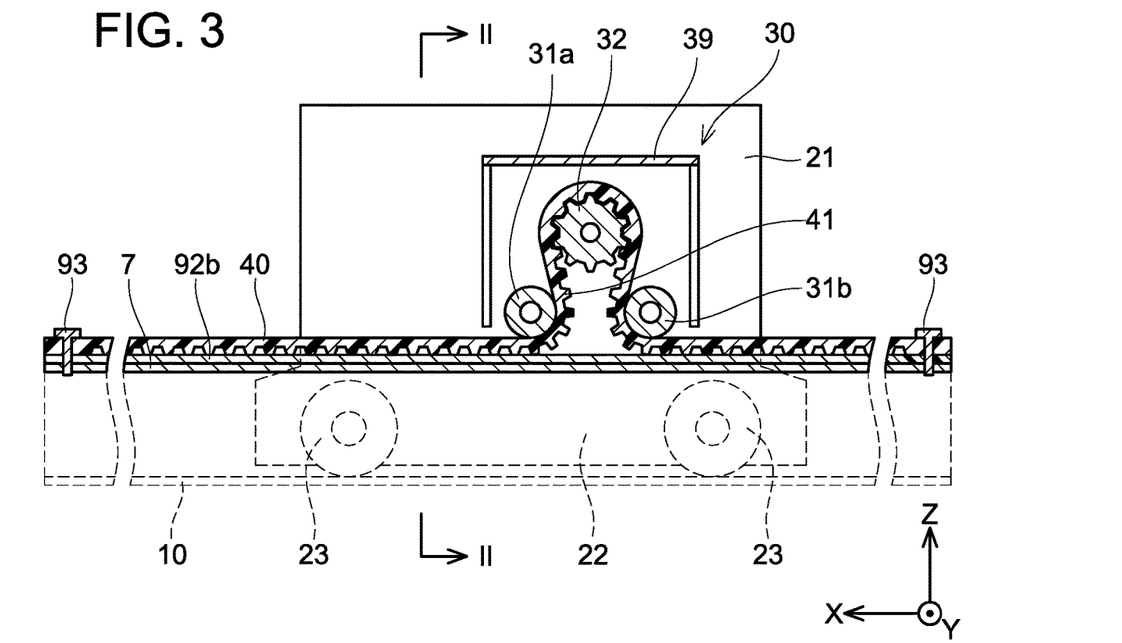
FIG. 3 is a cross-sectional view along a line III-Ill of FIG. 2.

FIG. 2 shows a cross-sectional view of the seat slider device 2. The cross-section of FIG. 2 is a cross-section that sections the lower rail 10 and the upper rail 20 along a plane that intersects perpendicularly to the rail longitudinal direction X direction). FIG. 2 is a cross-sectional view that sections the upper rail 20 at a position on a front side relative to an actuator 30 to be described later. FIG. 3 shows a cross-sectional view sectioned along a line III-III of FIG. 2. FIG. 3 corresponds to a cross-section sectioned along a plane transecting the actuator 30. FIG. 2 corresponds to a cross-sectional view along a line II-II of FIG. 3. The seat slider device 2 shown in FIGS. 2 and 3 is attached to each of the right and left sides of the lower portion of the seat cushion 81. In FIG. 2, a belt 40 (to be described later) is indicated in gray except in the cross-section thereof for easier understanding.

The upper rail 20 is provided with a lock mechanism configured to fix the upper rail 20 relative to the lower rail 10, however, the lock mechanism is not shown in the drawings. Since the lock mechanism is similar to a mechanism which conventional seat slider devices are provided with, description thereof will also be omitted.

Firstly, a shape of the lower rail 10 will be described with reference to FIG. 2. The lower rail 10 is accommodated in a rail groove 91 provided in the floor panel 90. The lower rail 10 is provided with a bottom plate 3 configured to be attached to a body of the vehicle, a pair of outer vertical plates 4, a pair of upper plates 5, and a pair of inner vertical plates 6. The pair of outer vertical plates 4 extends upward respectively from both ends of the bottom plate 3 in the rail short direction (Y direction in the drawing). The pair of upper plates 5 extends sideways respectively from upper ends of the outer vertical plates 4 toward a center in the rail short direction. The pair of inner vertical plates 6 extends downward respectively from inner ends of the upper plates 5. The pair of inner vertical plates 6 faces each other. The lower rail 10 opens upward between the pair of inner vertical plates 6. An upper surface of the lower rail 10 is provided with an opening elongated in the rail longitudinal direction.

The upper rail 20 will be described. A body lower part 22 of the upper rail 20 is located inside the lower rail 10 and supports rollers 23. The rollers 23 are in contact with the bottom plate 3 of the lower rail 10 and are configured to facilitate smooth movement of the upper rail 20. A body upper part 21 of the upper rail 20 is exposed above the lower rail 10. A frame, which is not shown, is attached to the body upper part 21, and the seat cushion is fixed to this frame. The body upper part 21 and the body lower part 22 are connected to each other through the opening of the lower rail 10. In other words, a part (the body lower part 22) of the upper rail 20 is located inside the lower rail 10 and a remaining part thereof (the body upper part 21) protrudes upward from the lower rail 10 through the opening of the lower rail 10.

The belt 40 is arranged next to the lower rail 10 in the short direction. As shown in FIG. 3, the belt 40 extends along the longitudinal direction of the lower rail 10 and has its both ends fixed to a supplemental plate 7 by bolts 93. The supplemental plate 7 is connected to the bottom plate 3 of the lower rail 10, is bent upward along one of the outer vertical plates 4 and is bent outward in the short direction (Y direction) of the lower rail 10 at substantially the same height as the upper plates 5. The belt 40 is placed on the supplemental plate 7. A T-shaped molding 92*b* is interposed between the belt 40 and the supplemental plate 7.

The belt 40 is a toothed belt, and the belt 40 is arranged so that its teeth 41 are oriented toward a lower surface side. The teeth 41 engage with a drive gear 32 to be described later. The belt 40 is constituted of resin or rubber.

A pair of T-shaped moldings 92*a*, 92*b* is provided to close the opening of the lower rail 10. The T-shaped molding 92*a* is fixed in a gap between the rail groove 91 and one of the outer vertical plates 4 by being interposed therebetween. The T-shaped molding 92*b* is interposed between the other of outer vertical plates 4 and the supplemental plate 7 and is fixed therebetween. The other T-shaped molding 92*b* spreads widely in the rail short direction toward outside of the lower rail 10. The T-shaped molding 92*b* spreads to a lower side of the belt 40. The T-shaped moldings 92*a*, 92*b* are constituted of soft resin.

The actuator 30 is provided on the upper rail 20. The actuator 30 is provided with the drive gear 32 that holds the belt 40 arranged along the lower rail 10 hung thereon and is configured to apply a drive force to a lower surface of the belt 40. The actuator 30 is provided with two guide rollers 31*a*, 31*b*. The two guide rollers 31*a*, 31*b* are in contact with an upper surface of the belt 40 placed on the supplemental plate 7. The drive gear 32 is arranged between the two guide rollers 31*a*, 31*b*. The belt 40 that has passed under the guide roller 31*a*, which is one of the guide rollers, is separated from the supplemental plate 7 and then is hung onto an upper side of the drive gear 32. The drive gear 32 engages with the teeth 41 on the lower surface of the belt 40. The belt 40 that has passed over the upper side of the drive gear 32 passes under the guide roller 31*b*, which is the other guide roller, and then is placed again onto the supplemental plate 7.

The drive gear 32 is rotated by a motor 35. When the drive gear 32 rotates, a drive force is applied to the belt 40. The drive force is applied to the teeth 41 on the lower surface of the belt 40. As described above, the both ends of the belt 40 are fixed to the supplemental plate 7. As such, the upper rail 20 moves along the rail longitudinal direction by the drive force applied to the belt 40. That is, the seat slider device 2 can move the seat with electrical power. The drive gear 32 and the guide rollers 31*a*, 31*b* are covered by a cover 39.

In the seat slider device 2, the drive gear 32 applies the drive force to the lower surface of the belt 40. The teeth 41 of the belt 40 are provided on the lower surface of the belt 40, thus dust is less likely to adhere to the teeth 41. Since dust is less likely to adhere to the teeth 41 to which the drive force is applied, a problem is less likely to occur in the mechanism configured to electrically move the seat. Further, since the teeth 41 are provided on the lower surface side of the belt 40, the teeth 41 are not visible to a passenger in the vehicle, which provides a good appearance.

Further, since the belt 40 is placed on the supplemental plate 7 which is attached to the bottom plate 3 of the lower rail 10, it can be attached to the floor panel 90 together with the lower rail 10. This facilitates work for mounting the seat slider device 2 including the belt 40 onto the vehicle.

Second Embodiment

Figure 4:
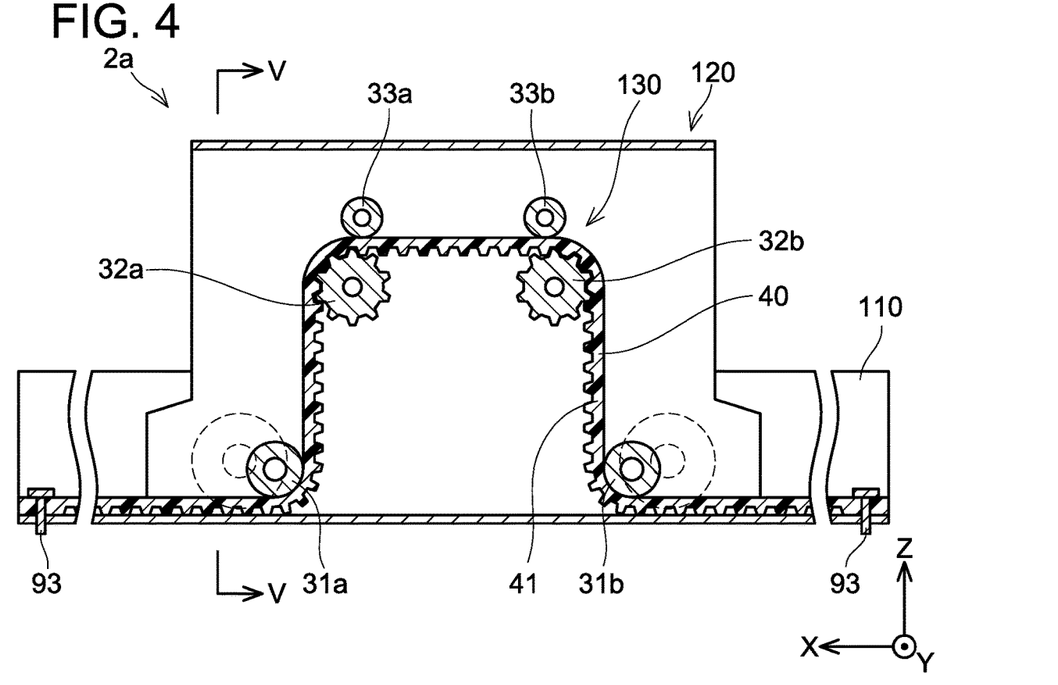
FIG. 4 is a cross-sectional view of a seat slider device of a second embodiment.
Figure 5:
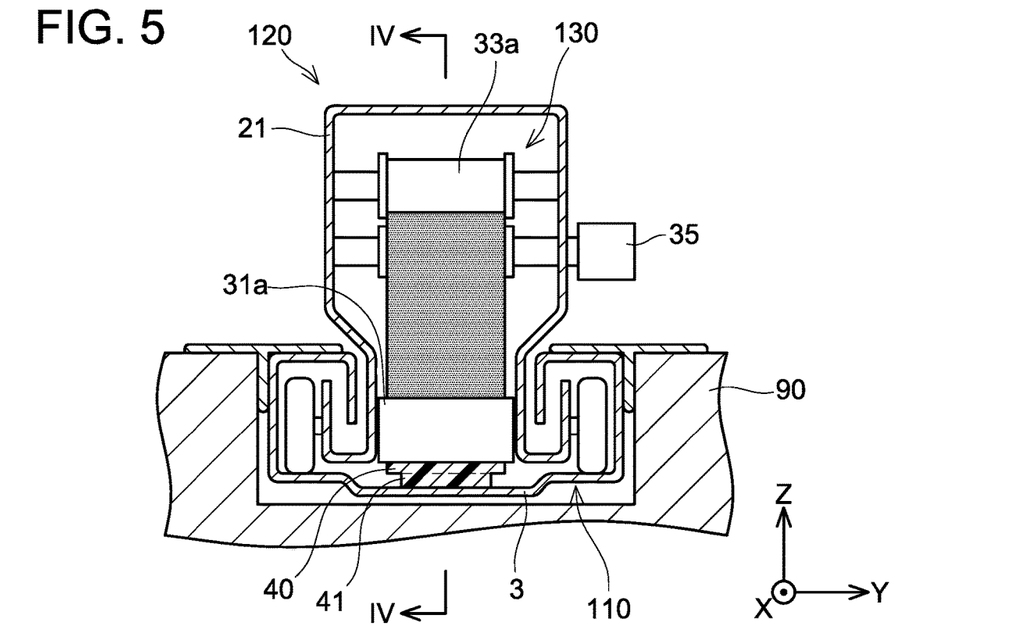
FIG. 5 is a cross-sectional view along a line V-V of FIG. 4.

A seat slider device 2a of a second embodiment will be described with reference to FIGS. 4 and 5. FIG. 4 shows a cross-section sectioned at a center of the seat slider device 2a in the rail short direction (Y direction in the drawing). FIG. 5 shows a cross-section sectioned along a line V-V of FIG. 4. FIG. 4 corresponds to a cross-section along a line IV-IV of FIG. 5. FIGS. 4 and 5 also omit a lock mechanism for fixing an upper rail 120 relative to a lower rail 110.

In the seat slider device 2a, the belt 40 is arranged inside the lower rail 110. The belt 40 is arranged such that the teeth 41 are oriented downward. The belt 40 is placed on the bottom plate 3. The both ends of the belt 40 are fixed to the lower rail 110 by the bolts 93.

An actuator 130 of the upper rail 120 has its components, other than the motor 35, placed inside a body of the upper rail 120. Aside from the motor 35, the actuator 130 is provided with a pair of the guide rollers 31a, 31b, a drive gear 32a, a driven gear 32b, and sub rollers 33a, 33b. The guide rollers 31a, 31b are in contact with the upper surface of the belt 40 placed on the bottom plate 3. The belt 40 that has passed under the guide roller 31a is separated from the bottom plate 3 and then is hung onto an upper side of the drive gear 32a. The teeth 41 provided on the lower surface of the belt 40 engage with the drive gear 32a. The belt 40 is interposed between the drive gear 32a and the sub roller 33a, thus it will not be detached from the drive gear 32a. The drive gear 32a is rotated by the motor 35. When the drive gear 32a rotates, a drive force is applied to the lower surface of the belt 40. Since the both ends of the belt 40 are fixed to the lower rail 110, the upper rail 120 moves by the drive force of the motor 35. That is, the seat is moved with electrical power.

The belt 40 that has passed between the drive gear 32a and the sub roller 33a then passes between the driven gear 32b and the sub roller 33b, further passes under the guide roller 31b, and is then returned onto the bottom plate 3.

In the seat slider device 2a of the second embodiment as well, the actuator 130 (drive gear 32a) applies the drive force to the lower surface of the belt 40. Since the teeth 41 are provided on the lower surface of the belt 40, dust is less likely to adhere to the teeth 41. Due to this, a problem is less likely to occur in the mechanism configured to electrically move the upper rail 120 (seat). Further, in the seat slider device 2a, the belt 40 is arranged within the lower rail 110 and passes through inside the upper rail 120. As such, the belt 40 cannot been seen from its surroundings, which provides a good appearance for the seat slider device 2a.

Third Embodiment

Figure 6:
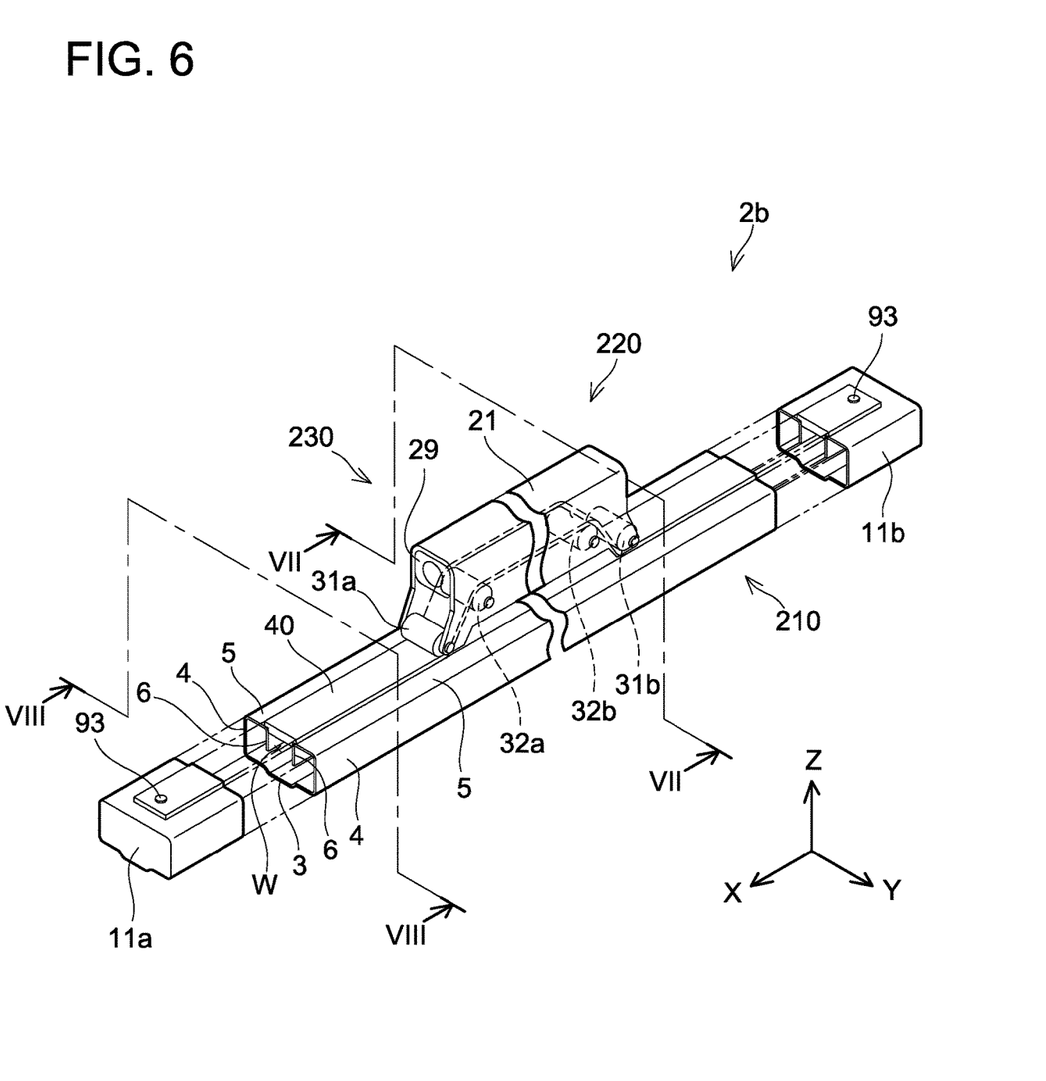
FIG. 6 is a perspective view of a seat slider device of a third embodiment.
Figure 7:
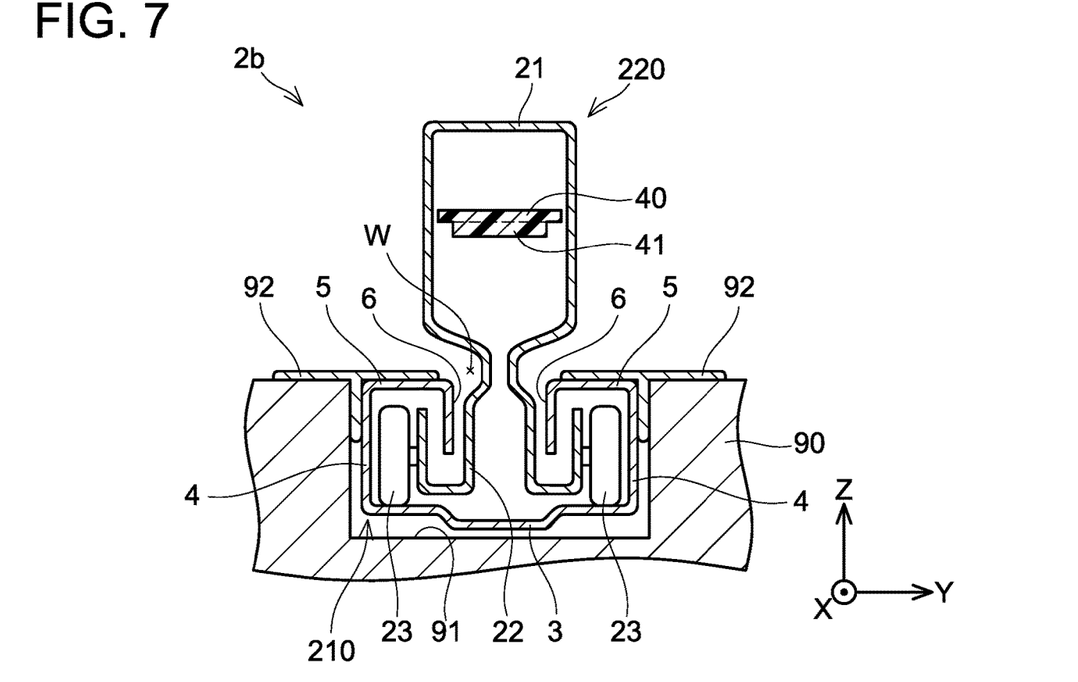
FIG. 7 is a cross-sectional view along a line VII-VII of FIG. 6.
Figure 8:
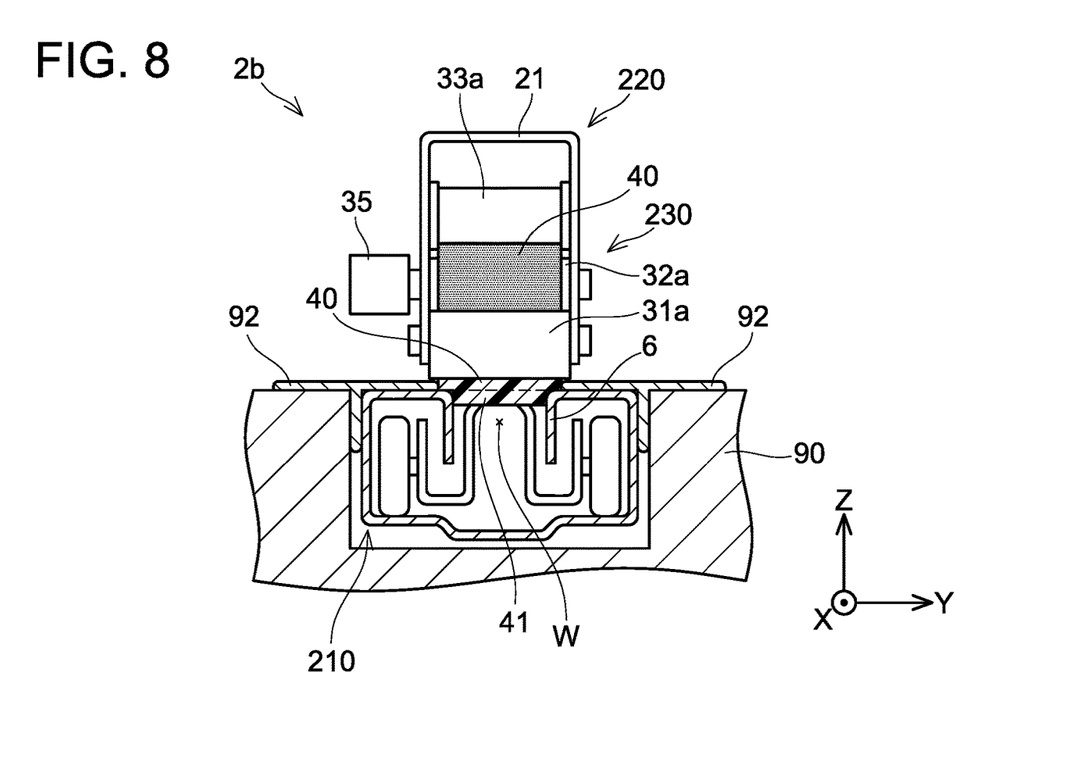
FIG. 8 is a cross-sectional view along a line VIII-VIII of FIG. 6.
Figure 9:
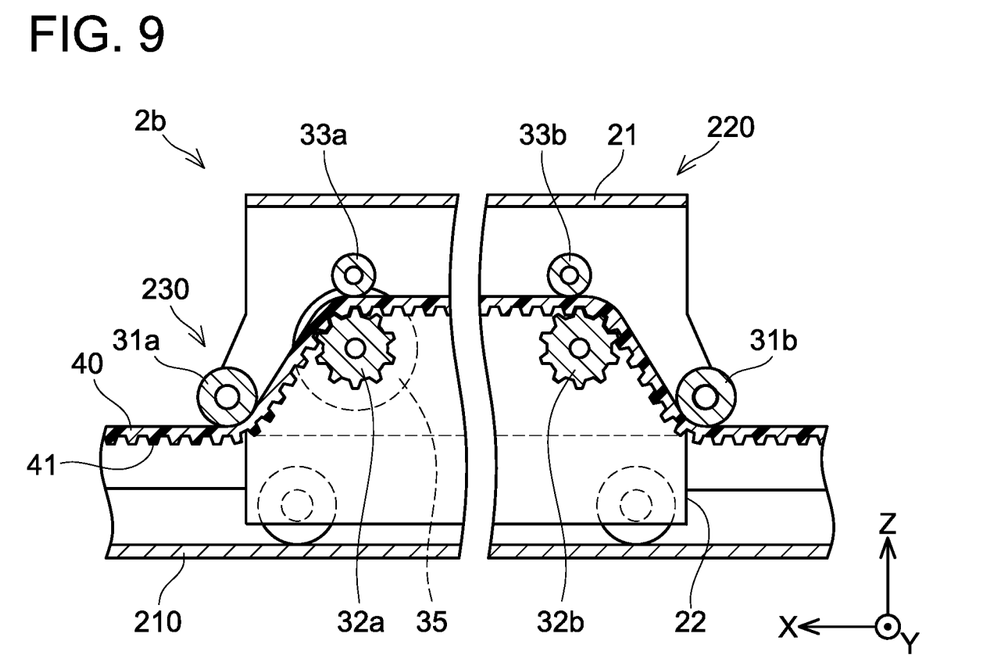
FIG. 9 is a cross-sectional view of the seat slider device of the third embodiment sectioned along an XZ plane.

A seat slider device 2b of a third embodiment will be described with reference to FIGS. 6 to 9. FIG. 6 shows a perspective view of the seat slider device 2b. FIG. 7 shows a cross-sectional view along a line VII-VII of FIG. 6, and FIG. 8 shows a cross-sectional view along a line VIII-VIII of FIG. 6. FIG. 9 shows a cross-sectional view sectioned at a center of the seat slider device 2b in the short direction.

FIG. 9 is a cross-sectional view of the seat slider device 2b sectioned along an XZ plane in the coordinate system of the drawing.

In the seat slider device 2b, the belt 40 is arranged to close an opening W of a lower rail 210. The opening W is a space between a pair of the inner vertical plates 6. In other words, an upper surface of the lower rail 210 is provided with the opening W that is elongated in the rail longitudinal direction. As shown in FIG. 7, the body lower part 22 and the body upper part 21 of an upper rail 220 are connected to each other through the opening W. The body lower part 22 located inside the lower rail 210 is a portion that supports the rollers 23. As shown in FIG. 6, the belt 40 has its both ends fixed by bolts 93 at a front end 11a and a rear end 11b of the lower rail 110. In FIG. 8, the belt 40 is indicated in gray except in the cross-section thereof for easier understanding. The belt 40 is a toothed belt in which the teeth 41 are provided on a lower surface thereof. A width of the teeth 41 is narrower than a width of the belt 40, and the teeth 41 engage with the opening W of the lower rail 210.

An actuator 230 provided in the upper rail 220 is placed inside the body upper part 21 of the upper rail 220, except for its motor 35. The actuator 230 is provided with a pair of the guide rollers 31a, 31b, the drive gear 32a, the driven gear 32b, and the sub rollers 33a, 33b. In FIG. 6, the motor 35 and the sub rollers 33a, 33b are omitted.

The guide rollers 31a, 31b are arranged respectively at both ends of the body upper part 21 of the upper rail 220 in the rail longitudinal direction. Lower ends of the guide rollers 31a, 31b are in contact with the upper surface of the belt 40. In FIG. 9, when the upper rail 220 moves toward the left in the drawing, the belt that has passed under the guide roller 31a, toward which the upper rail 220 moves, is pulled up from the opening W of the lower rail 210, and is hung onto an upper surface of the drive gear 32a inside the body upper part 21. The teeth 41 of the belt 40 engage with the drive gear 32a. When the drive gear 32a is rotated by the motor 35, a drive force thereof is applied to the lower surface of the belt 40. Since the belt 40 has its both ends fixed to the lower rail 210, the upper rail 220 moves by the drive force of the motor 35. That is, the upper rail 220 (seat) is moved with electrical power.

The belt 40 that has passed between the drive gear 32a and the sub roller 33a then passes between the driven gear 32b and the sub roller 33b. The belt 40 passes under the guide roller 31b, which is located on rear side relative to the upper rail 220 which is advancing, and is returned into the opening W again.

Since the belt 40 closes the opening W of the lower rail 210, dust is less likely to enter inside of the lower rail 210 in the seat slider device 2b. Further, the opening W of the lower rail 210 cannot be seen, which provides a good appearance. Further, since the teeth 41 to which the drive force is applied are provided on the lower surface of the belt 40, dust is less likely to adhere to the teeth 41. When the upper rail 220 moves, the belt 40, which is closing the opening W, is pulled up from the opening W, passes inside of the body upper part 21 of the upper rail 220, and then is returned again into the opening W at the rear side in the progressing direction. The belt 40 closes the opening W of the lower rail 210 without hindering the movement of the upper rail 220.

Fourth Embodiment

Figure 10:
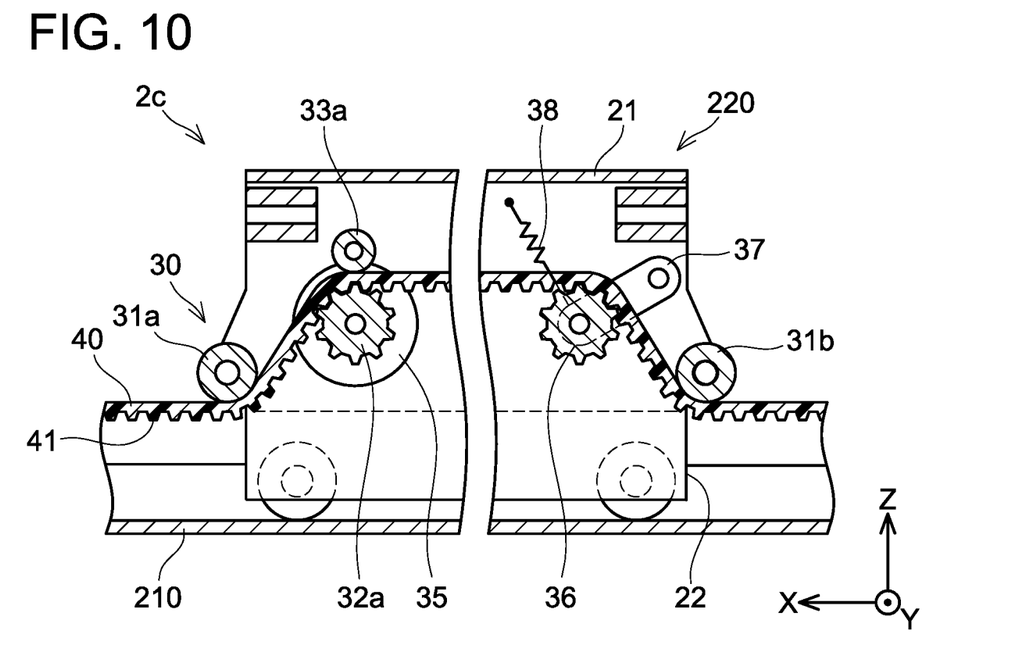
FIG. 10 is a cross-sectional view of a seat slider device of a fourth embodiment sectioned along an XZ plane.

A seat slider device 2c of a fourth embodiment will be described with reference to FIG. 10. FIG. 10 is a cross-sectional view that sections the seat slider device 2c along an XZ plane in the coordinate system of the drawing. In FIG. 10 as well, a lock mechanism for fixing the upper rail 220 relative to the lower rail 210 is omitted.

In the seat slider device 2c, a driven gear 36 engaged with the belt 40 is supported by a cam 37. One end of the cam 37 is rotatably supported by the body upper part 21 of the upper rail 220 and another end of the cam 37 is attached to the driven gear 36. The driven gear 36 is supported by the cam 37 so as to be swingable up and down. A spring 38 is attached to the cam 37. One end of the spring 38 is fixed to the cam 37 and another end thereof is fixed to the body upper part 21 above the cam 37. The cam 37 (that is, the driven gear 36) is biased upward by the spring 38. Since the belt 40 is hung over an upper side of the driven gear 36, tension is applied to the belt 40 in a longitudinal direction thereof by a biasing force of the spring 38. With the tension in the longitudinal direction applied to the belt 40, the belt 40 closing the opening W is suppressed from becoming loose. The seat slider device 2c of the fourth embodiment has the same structure as the structure of the seat slider device 2b of the third embodiment, except that it is provided with the driven gear 36, the cam 37, and the spring 38. The driven gear 36, the cam 37, and the spring 38 are a mechanism configured to apply tension to the belt 40 in the longitudinal direction.

Fifth Embodiment

Figure 11:
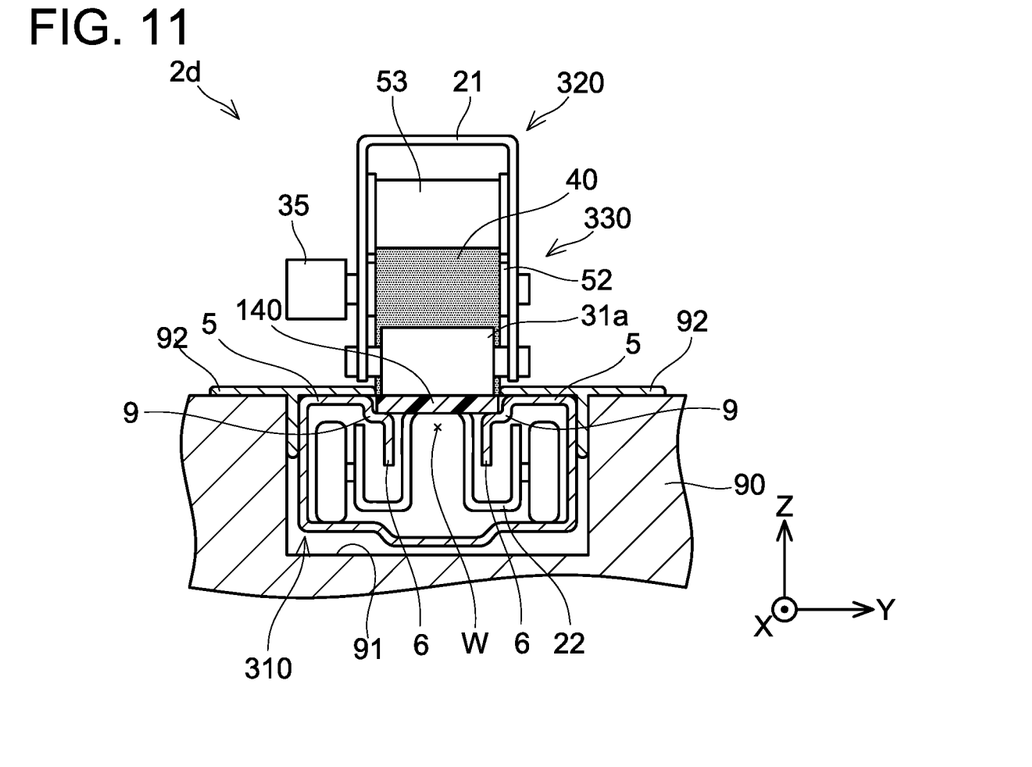
FIG. 11 is a cross-sectional view of a seat slider device of a fifth embodiment sectioned at a front portion of an upper rail.

A seat slider device 2d of a fifth embodiment will be described with reference to FIG. 11. FIG. 11 is a cross-sectional view that sections the seat slider device 2d at a front portion of an upper rail 320. That is, FIG. 11 depicts a cross-section of a lower rail 310 and a front view of the upper rail 320. The seat slider device 2d employs a flat friction belt 140 instead of a toothed belt. A lower surface of the friction belt 140 is a surface to which a drive force is applied. In FIG. 11, the friction belt 140 is indicated in gray in the cross-section thereof for easier understanding.

The lower rail 310 is provided with recesses 9 at connecting portions of upper plates 5 and inner vertical plates 6 along the rail longitudinal direction. The friction belt 140 fits in the pair of recesses 9 located on right and left sides of the opening W in its width direction. The friction belt 140 fits in the recesses of the lower rail 310, by which it is less likely to be detached from the opening W.

The seat slider device 2b is provided with an actuator 330. The actuator 330 is provided with a drive roller 52 as a substitute to the drive gear 32a of the seat driver device 2b of the third embodiment. The actuator 330 is provided with a pair of the guide rollers 31a, 31b, the motor 35, and a sub roller 53, similarly to the actuator 230. The pair of guide rollers 31a, 31b is arranged respectively on both ends of the body upper part 21 of the upper rail 320 in the rail longitudinal direction. The guide roller 31a is arranged at a front end of the body upper part 21, and the guide roller 31b is arranged at a rear end of the body upper part 21 although it is not visible in FIG. 11. Lower ends of the guide rollers 31a, 31b are in contact with an upper surface of the friction belt 140. The front-side guide roller 31a is in contact with the upper surface of the friction belt 140 engaged with the lower rail 310. When the upper rail 320 moves forward (that is, in the +X direction in the coordinate system of the drawing), the friction belt 140 that has passed under the guide roller 31a, toward which the upper rail 320 moves, is pulled up from the opening W of the lower rail 310 and is then hung onto an upper surface of the drive roller 52 inside the body upper part 21. The friction belt 140 that has passed over the drive roller 52 passes under the rear-side guide roller 31b and engages with the opening W again.

The friction belt 140 is interposed between the drive roller 52 and the sub roller 53. The drive roller 52 is rotated by the motor 35. When the drive roller 52 rotates by the motor 35, a frictional drive force thereof is applied to a lower surface of the belt 140. Since the friction belt 140 has its both ends fixed to the lower rail 310, the upper rail 320 moves by the drive force of the motor 35. That is, the upper rail 320 (seat) is moved with electrical power. Since the lower surface of the friction belt 140 is a surface to which the drive force is applied in the seat slider device 2d as well, dust is less likely to adhere to the drive force application surface. Due to this, the frictional force between the drive roller 52 and the friction belt 140 is less likely to decrease.

Some features of the art described in the embodiments will be listed. The belt 40 and the friction belt 140 are constituted of soft resin or rubber. The belt 40 may be constituted of a plurality of small pieces, and adjacent small pieces may be swingably coupled to each other.

The guide rollers 31a, 31b of the embodiments correspond to an example of a pair of guides. The guides may be pins configured to slide relative to the belt, as a substitute to the rollers which rotate accompanying the movement of the belt.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A seat slider device comprising:
a lower rail attachable to a body of a vehicle;
a belt arranged along a longitudinal direction of the lower rail and having both ends thereof fixed; and
an upper rail attachable to a seat, slidably engaging with the lower rail, and comprising an actuator configured to feed the belt,
wherein:
the actuator is configured to apply a drive force on a lower surface of the belt,
the lower rail is provided with an opening elongated along the longitudinal direction, and
the belt covers the opening.

2. The seat slider device of claim 1, wherein the actuator comprises a drive roller contacting the lower surface of the belt.

3. The seat slider device of claim 1, wherein
the belt is provided with teeth and is arranged with the teeth facing downward, and
the actuator comprises a drive gear configured to engage with the teeth of the belt.

4. The seat slider device of claim 1, wherein the belt is placed within the lower rail.

5. The seat slider device of claim 1, wherein the actuator comprises:

a pair of guides, wherein the guides are arranged respectively at both ends of the upper rail in the longitudinal direction and are in contact with an upper surface of the belt which covers the opening; and one of a drive roller and a drive gear which is arranged between the pair of guides and is in contact with a part of the lower surface of the belt that is pulled away from the opening.

6. The seat slider device of claim 1, wherein the belt engages with the opening.

7. The seat slider device of claim 6, wherein the belt is provided with teeth, and the teeth of the belt engage with the opening.

8. A seat slider device comprising:

a lower rail attachable to a body of a vehicle;

a belt arranged along a longitudinal direction of the lower rail and having both ends thereof fixed; and an upper rail attachable to a seat, slidably engaging with the lower rail, and comprising an actuator configured to feed the belt, wherein:

the actuator is configured to apply a drive force on a lower surface of the belt, and the upper rail comprises a mechanism configured to apply tension in the longitudinal direction to the belt.

9. A seat slider device comprising:

a lower rail attachable to a body of a vehicle;

a belt arranged along a longitudinal direction of the lower rail and having both ends thereof fixed;

an upper rail attachable to a seat, slidably engaging with the lower rail; and an actuator arranged in the upper rail and configured to feed the belt;

wherein the actuator comprises:

a drive roller in contact with a lower surface of the belt and configured to apply a drive force to the belt;

a driven roller in contact with the lower surface of the belt; and a pair of guides in contact with an upper surface of the belt, wherein the drive roller and the driven roller are arranged between the pair of guides.

* * * * *